(12) United States Patent
Ogino et al.

(10) Patent No.: US 9,436,536 B2
(45) Date of Patent: Sep. 6, 2016

(54) MEMORY DUMP METHOD, INFORMATION PROCESSING APPARATUS, AND NON-TRANSITORY COMPUTER-READABLE STORAGE MEDIUM

(71) Applicant: FUJITSU LIMITED, Kawasaki-shi, Kanagawa (JP)

(72) Inventors: Hajime Ogino, Kawasaki (JP); Kensuke Ishida, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 14/313,272

(22) Filed: Jun. 24, 2014

(65) Prior Publication Data
US 2015/0033083 A1 Jan. 29, 2015

(30) Foreign Application Priority Data
Jul. 26, 2013 (JP) ................................. 2013-156069

(51) Int. Cl.
G06F 11/00 (2006.01)
G06F 11/07 (2006.01)
G06F 11/20 (2006.01)

(52) U.S. Cl.
CPC ....... *G06F 11/0778* (2013.01); *G06F 11/0712* (2013.01); *G06F 11/20* (2013.01)

(58) Field of Classification Search
CPC ........... G06F 11/0712; G06F 11/0778; G06F 11/142; G06F 11/1428; G06F 11/20; G06F 11/202; G06F 11/2028; G06F 11/2038; G06F 11/2041; G06F 11/2048
See application file for complete search history.

(56) References Cited

U.S. PATENT DOCUMENTS

| 5,345,590 | A * | 9/1994 | Ault | G06F 11/0712 711/170 |
| 6,199,179 | B1 * | 3/2001 | Kauffman | G06F 9/5077 714/11 |
| 6,378,021 | B1 * | 4/2002 | Okazawa | G06F 15/17375 710/104 |
| 6,574,748 | B1 * | 6/2003 | Andress | G06F 11/2025 714/11 |
| 7,657,776 | B2 * | 2/2010 | Rajkumari | G06F 11/004 714/2 |
| 7,877,358 | B2 * | 1/2011 | Ritz | G06F 11/2025 707/640 |
| 8,423,816 | B2 * | 4/2013 | Katano | G06F 11/0712 714/3 |

(Continued)

FOREIGN PATENT DOCUMENTS

EP 2 453 359 A1 5/2012
JP 2000-305815 11/2000

(Continued)

OTHER PUBLICATIONS
Extended European Search Report issued Nov. 20, 2015 in corresponding European Patent Application No. 14174720.4.

*Primary Examiner* — Marc Duncan
(74) *Attorney, Agent, or Firm* — Staas & Halsey LLP

(57) ABSTRACT

A memory dump method includes performing information processing using a first partition including a first device board and a second device, detecting an error in the first device, after detecting the error, performing information processing using a second partition including a third device, after detecting the error, performing a memory dump on each of the first device and the second device to obtain dump data, and after the memory dump is performed, adding the second device to the second partition.

20 Claims, 18 Drawing Sheets

(56) References Cited

U.S. PATENT DOCUMENTS

| | | | | |
|---|---|---|---|---|
| 8,555,110 B2* | 10/2013 | Shimose | ............ | G06F 11/2025 714/13 |
| 8,677,374 B2* | 3/2014 | Aslot | ................ | G06F 9/45558 714/2 |
| 2003/0163744 A1* | 8/2003 | Yamazaki | ........... | G06F 11/1658 713/300 |
| 2004/0107383 A1* | 6/2004 | Bouchier | ............. | G06F 9/5061 714/4.3 |
| 2004/0221193 A1* | 11/2004 | Armstrong | ......... | G06F 11/2028 714/10 |
| 2005/0240806 A1 | 10/2005 | Bruckert et al. | | |
| 2007/0061613 A1 | 3/2007 | Ohashi et al. | | |
| 2007/0101191 A1* | 5/2007 | Iwama | ............... | G06F 11/0712 714/15 |
| 2008/0091746 A1* | 4/2008 | Hatasaki | ............ | G06F 11/2033 |
| 2008/0120518 A1* | 5/2008 | Ritz | .................... | G06F 11/2025 714/3 |
| 2008/0133968 A1* | 6/2008 | Muppirala | ......... | G06F 11/0778 714/13 |
| 2008/0294839 A1 | 11/2008 | Bell et al. | | |
| 2012/0102358 A1* | 4/2012 | Kondo | ............... | G06F 11/0724 714/23 |
| 2013/0067467 A1* | 3/2013 | Aslot | ................ | G06F 9/45558 718/1 |

FOREIGN PATENT DOCUMENTS

| | | |
|---|---|---|
| JP | 2007-42001 | 2/2007 |
| JP | 2007-80012 | 3/2007 |
| JP | 2007-122552 | 5/2007 |

* cited by examiner

FIG. 3

| PARTITION | MODULE |
|---|---|
| 1 | SYSTEM BOARDS S1,S2,S3 |
|   | I/O UNITS U1,U2,U3,U4 |
| 2 |  |
|   |  |
| ⋮ | ⋮ |

MEMORY DUMP METHOD, INFORMATION PROCESSING APPARATUS, AND NON-TRANSITORY COMPUTER-READABLE STORAGE MEDIUM

CROSS-REFERENCE TO RELATED APPLICATION

This application is based upon and claims the benefit of priority of the prior Japanese Patent Application No. 2013-156069, filed on Jul. 26, 2013, the entire contents of which are incorporated herein by reference.

FIELD

The embodiments discussed herein are related to memory dump method, information processing Apparatus, and non-transitory computer-readable storage medium.

BACKGROUND

When an abnormality occurs in a system that executes operational processing, data in a memory at the time of the occurrence of the abnormality is stored in another storage medium, such as a hard disk, or the like in order to identify the cause of the abnormality. This processing is called a memory dump. While the memory dump is being executed, it is not allowed to use a memory from which a memory dump is taken, and thus system down occurs, or processing performance of operational processing is deteriorated.

In order to reduce the influence on operational processing when a memory dump is taken, the following technique is provided. Specifically, when an abnormality occurs in a specific partition in a system, the partition in which the abnormality has occurred is shut down. And a cell included in the partition is replaced by a preliminary cell, and the partition in which the abnormality has occurred is restarted. Here, the "cell" is a system board, for example. On the other hand, a memory dump is performed on the cell removed from the partition in which the abnormality has occurred, and data (hereinafter referred to as dump data) obtained by the memory dump is stored into a disk. In this manner, it becomes possible to perform a memory dump while shortening down time of the system.

However, in the above-described related-art technique, it is assumed that an abnormality occurs in a partition including only one system board, and it is not assumed that an abnormality occurs in a partition including a plurality of system boards. Accordingly, if the related-art technique is applied to a partition including a plurality of system boards, it becomes difficult to store only a part of data of a memory area in use, and to analyze the cause of the abnormality. As a relevant related-art document, Japanese Patent No. 4645837 has been known.

SUMMARY

According to an aspect of the invention, a memory dump method includes performing information processing using a first partition including a first device board and a second device, detecting an error in the first device, after detecting the error, performing information processing using a second partition including a third device, after detecting the error, performing a memory dump on each of the first device and the second device to obtain dump data, and after the memory dump is performed, adding the second device to the second partition.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating an example of a partition table stored in a management data storage unit;

DESCRIPTION OF EMBODIMENTS

It is desirable to provide a technique for obtaining dump data without omission when an abnormality occurs in a partition including a plurality of system boards.

If an abnormality occurs in a partition including a plurality of system boards, it becomes possible to obtain dump data without omission.

First Embodiment

Figure 1:
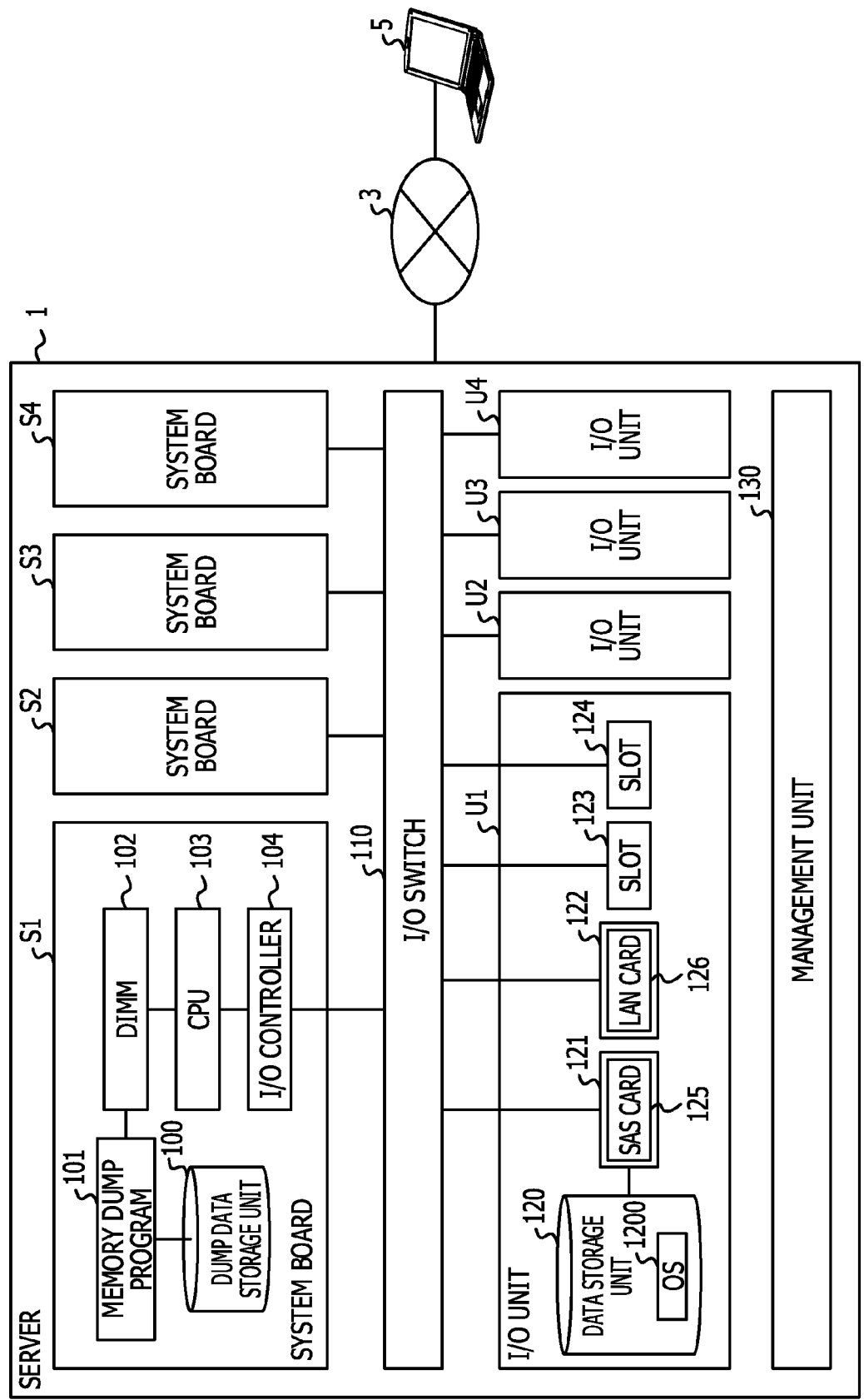
FIG. 1 is a diagram illustrating an overview of a system according to a first embodiment.

FIG. 1 illustrates an overview of a system according to a first embodiment. In the first embodiment, a server 1 and a management terminal 5 are connected to a network 3, which is a local area network (LAN), for example. The server 1 executes operational processing. The management terminal 5 is a terminal operated by an administrator. The administrator operates the management terminal 5 so as to monitor whether the server 1 performs the operational processing without a problem.

The server 1 includes an input/output (I/O) switch 110, which relays data between system boards (also referred to as main boards or motherboards) S1 to S4 and the other modules, I/O units U1 to U4, which includes devices, such as a hard disk drive or a peripheral component interconnect (PCI) slot, and the like, and a management unit 130.

The system board S1 includes, for example, a dump data storage unit 100, which is disposed on a storage medium, such as a hard disk, or the like, for storing dump data obtained by a memory dump, a memory dump program 101, which is a program in a basic input/output system (BIOS) program, a dual inline memory module (DIMM) 102, a central processing unit (CPU) 103, and an I/O controller 104. In this regard, system boards S2 to S4 have the same configuration as that of the system board S1.

The I/O unit U1 includes, for example, a data storage unit 120, which is disposed on a storage medium, such as a hard disk, or the like, for storing an OS 1200 program, for example, slots 121 to 124, which are PCI slots, a serial attached small computer system interface (SAS) card 125, which is connected to the slot 121, and a LAN card 126, which is connected to the slot 122. In this regard, the I/O units U2 to U4 have the same configuration as that of the I/O unit U1.

Figure 2:
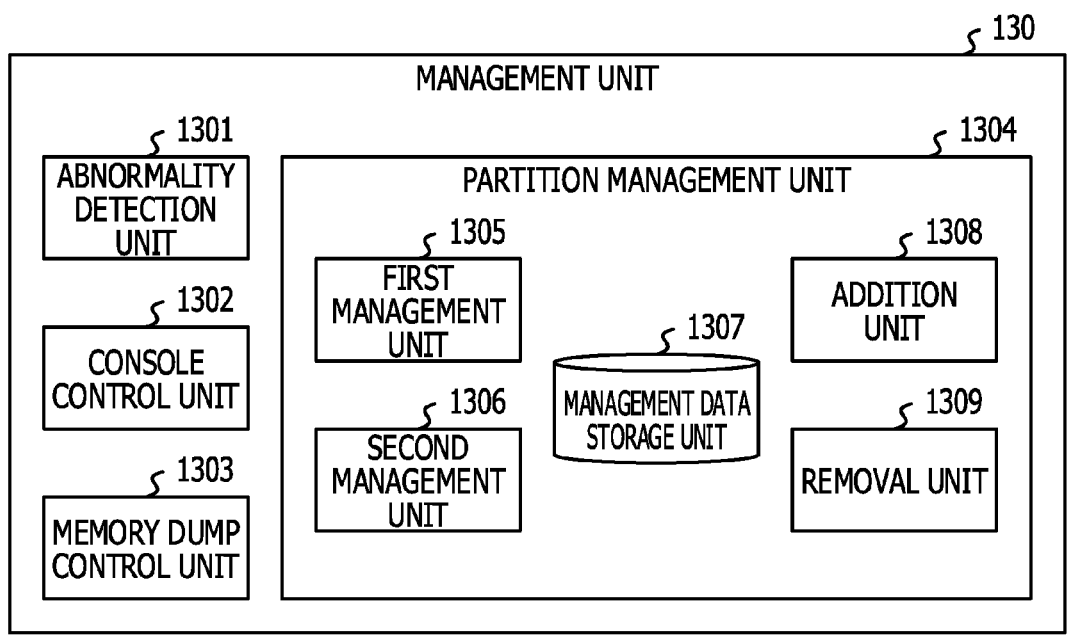
FIG. 2 is a functional block diagram of a management unit.

FIG. 2 illustrates a functional block diagram of the management unit 130. The management unit 130 includes an abnormality detection unit 1301, a console control unit 1302, a memory dump control unit 1303, and a partition management unit 1304 including a first management unit 1305, a second management unit 1306, a management data storage unit 1307, an addition unit 1308, and a removal unit 1309.

The abnormality detection unit 1301 detects that an abnormality has occurred in the server 1. The console control unit 1302 performs processing requested from the management terminal 5, and the like. The memory dump control unit 1303 controls execution of the memory dump program 101 in the BIOS.

The first management unit 1305 and the second management unit 1306 perform management of the partitions created in the server 1. The addition unit 1308 adds a module to a partition by Hot Swap. This processing is called Hot Add. The removal unit 1309 removes a module from a partition by Hot Swap. This processing is called Hot Remove.

FIG. 3 illustrates an example of a partition table stored in the management data storage unit 1307. In the example in FIG. 3, identification information of a partition, and identification information of a module included in the partition are stored in the partition table.

Figure 4:
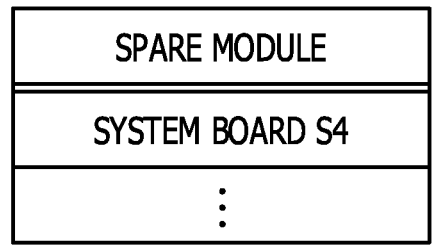
FIG. 4 is a diagram illustrating an example of reserve data stored in the management data storage unit.
Figure 5:
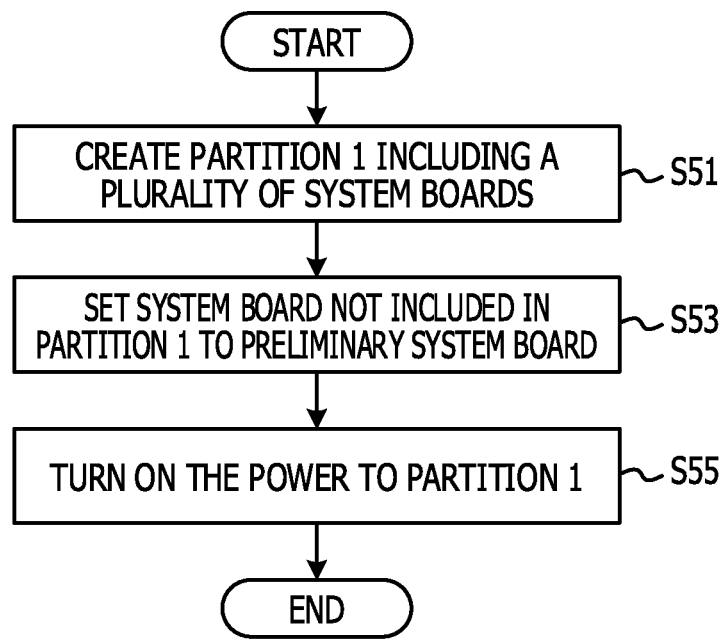
FIG. 5 is a flowchart of processing executed at the time of starting operational processing.

FIG. 4 illustrates an example of a reserve table stored in the management data storage unit 1307. In the example in FIG. 4, identification information of a preliminary module, which is not allocated to any one of the partitions in the server 1, is stored in the reserve table.

Next, a description will be given of operation of the server 1 according to the first embodiment with reference to FIG. 5 to FIG. 12. First, a description will be given of processing that the server 1 executes when starting operational processing with reference to FIG. 5.

The first management unit 1305 in the server 1 creates a partition 1 including a plurality of system boards (step S51). For example, the first management unit 1305 creates the partition 1 including a system board S1, a system board S2, a system board S3, an I/O unit U1, an I/O unit U2, an I/O unit U3, and an I/O unit U4. In this regard, the first management unit 1305 stores data on the partition 1 into the partition table in the management data storage unit 1307.

The first management unit 1305 sets a system board that is not included in the partition 1 to a preliminary system board (step S53). For example, the first management unit 1305 sets the system board S4 to a preliminary system board. In this regard, the first management unit 1305 stores data on the preliminary system board in the reserve table in the management data storage unit 1307.

The first management unit 1305 turns on the power to the partition 1 (step S55). And the processing is completed. When the processing in step S55 is completed, the OS 1200 in the I/O unit U1 is started. The OS 1200 and data of application programs executed on the OS 1200 are stored in the DIMM 102 in the system board S1, the DIMM 102 in the system board S2, and the DIMM 102 in the system board S3.

By executing the above-described processing, operational processing by a plurality of system boards is started.

Figure 6:
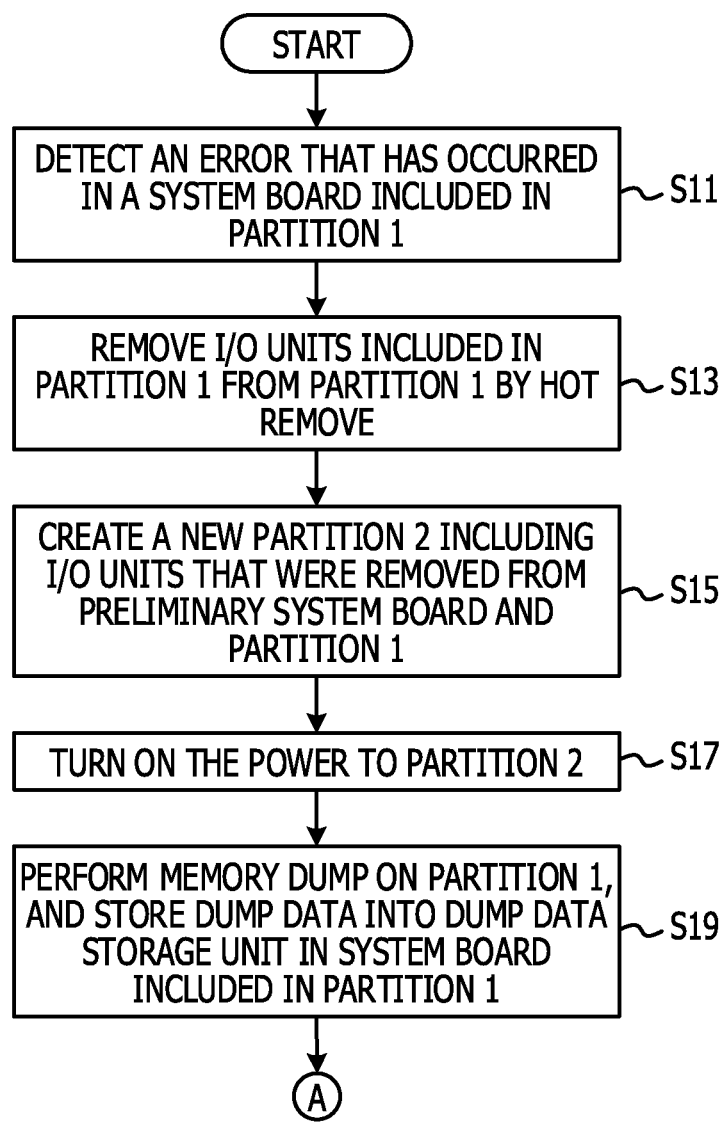
FIG. 6 is a flowchart of processing executed when an error occurs in a partition in operation.

Next, a description will be given of processing when an error occurs in a partition in operation with reference to FIG. 6 and FIG. 7.

First, the abnormality detection unit 1301 detects an error that has occurred in a system board included in the partition 1 (step S11). For example, the abnormality detection unit 1301 detects an error that has occurred in the system board 1. The abnormality detection unit 1301 notifies the detection of the abnormality to the partition management unit 1304.

The removal unit 1309 in the partition management unit 1304 removes I/O units included in the partition 1 from the partition 1 by Hot Remove (step S13). For example, the removal unit 1309 removes the I/O unit U1, the I/O unit U2, the I/O unit U3, the I/O unit U4 from the partition 1. The Hot Remove is processing that removes a module from a partition without stopping the OS. In this regard, the removal unit 1309 updates data on the partition 1 that is stored in the partition table in the management data storage unit 1307 so that the removal of the I/O unit is reflected on the data.

The first management unit 1305 creates a new partition 2 including the preliminary system board stored in the reserve table in the management data storage unit 1307, and the I/O units that have been removed from the partition 1 (step S15). For example, the first management unit 1305 creates a partition 2 including the system board S4, the I/O unit U1, the I/O unit U2, the I/O unit U3, and the I/O unit U4. In this regard, the first management unit 1305 stores data in the partition 2 into the partition table in the management data storage unit 1307.

The first management unit 1305 turns on the power to the partition 2 (step S17). Thereby, the OS 1200 in any one of the I/O units included in the partition 2 is started, and the operational processing is restarted.

The memory dump control unit 1303 performs a memory dump on the partition 1 by the memory dump program 101 in the BIOS. And the memory dump control unit 1303 stores dump data obtained by execution of the memory dump into the dump data storage unit 100 of the system board included in the partition 1 (step S19). For example, the memory dump control unit 1303 stores dump data into the dump data storage unit 100 of the system board S1. By the processing in step S19, it is possible to obtain the data in the DIMM 102 at the time of the occurrence of an abnormality without omission. The processing proceeds to step S21 in FIG. 7 through a connector symbol A.

Figure 7:
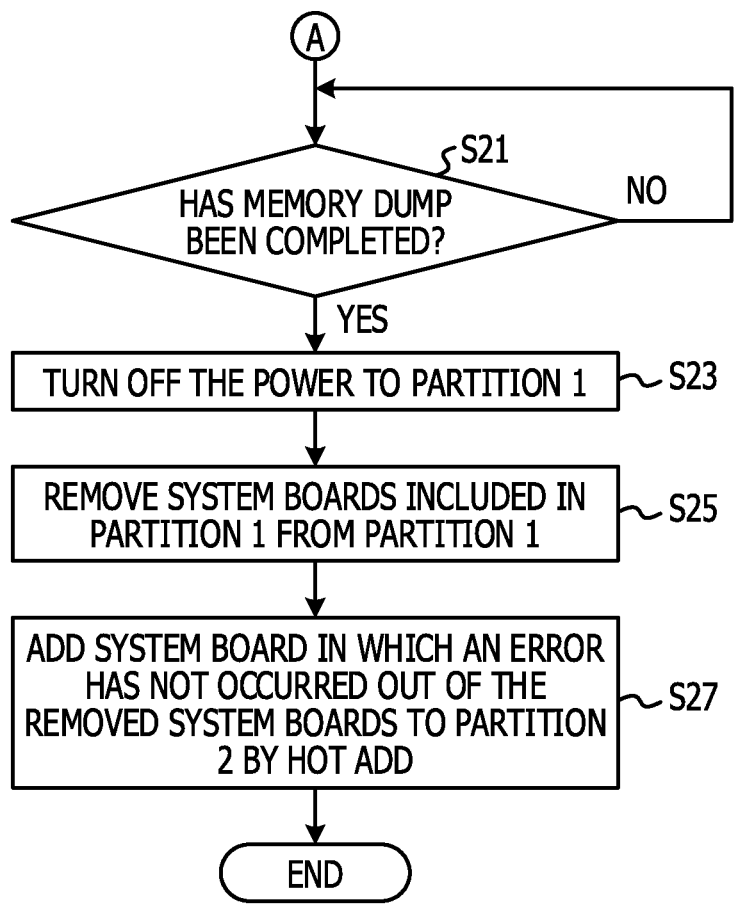
FIG. 7 is a flowchart of processing executed when an error occurs in a partition in operation.

Referring to FIG. 7, the memory dump control unit 1303 makes an inquiry to the memory dump program 101 in order to determine whether the memory dump has completed (step S21). In this regard, the memory dump control unit 1303 makes inquiries on a regular basis, for example.

If the memory dump has not been completed (step S21: No), the processing in step S21 is performed again. If the memory dump has been completed (step S21: Yes), the memory dump control unit 1303 notifies the completion of the memory dump to the partition management unit 1304.

The second management unit 1306 in the partition management unit 1304 turns off the power to the partition 1 (step S23). Also, the second management unit 1306 removes the system boards included in the partition 1 from the partition 1 (step S25). For example, the second management unit 1306 removes the system board S1, the system board S2, and the system board S3 from the partition 1. In this regard, the second management unit 1306 updates the data on the partition 1 stored in the partition table in the management data storage unit 1307 so that the removal of the system boards is reflected on the data.

The addition unit 1308 adds a system board in which an error has not occurred among the system boards that have been removed in step S25 to the partition 2 by Hot Add (step S27). For example, the addition unit 1308 adds the system board S2 and the system board S3 to the partition 2 by Hot Add. And the processing is completed.

By performing the above-described processing, it becomes possible to obtain dump data from a memory area used at the time of the occurrence of the abnormality. Also, by adding system boards in which an abnormality has not occurred among the system boards included in an old partition to a new partition, it is possible to avoid a state in which the processing performance of the operational processing is kept low.

Figure 8:
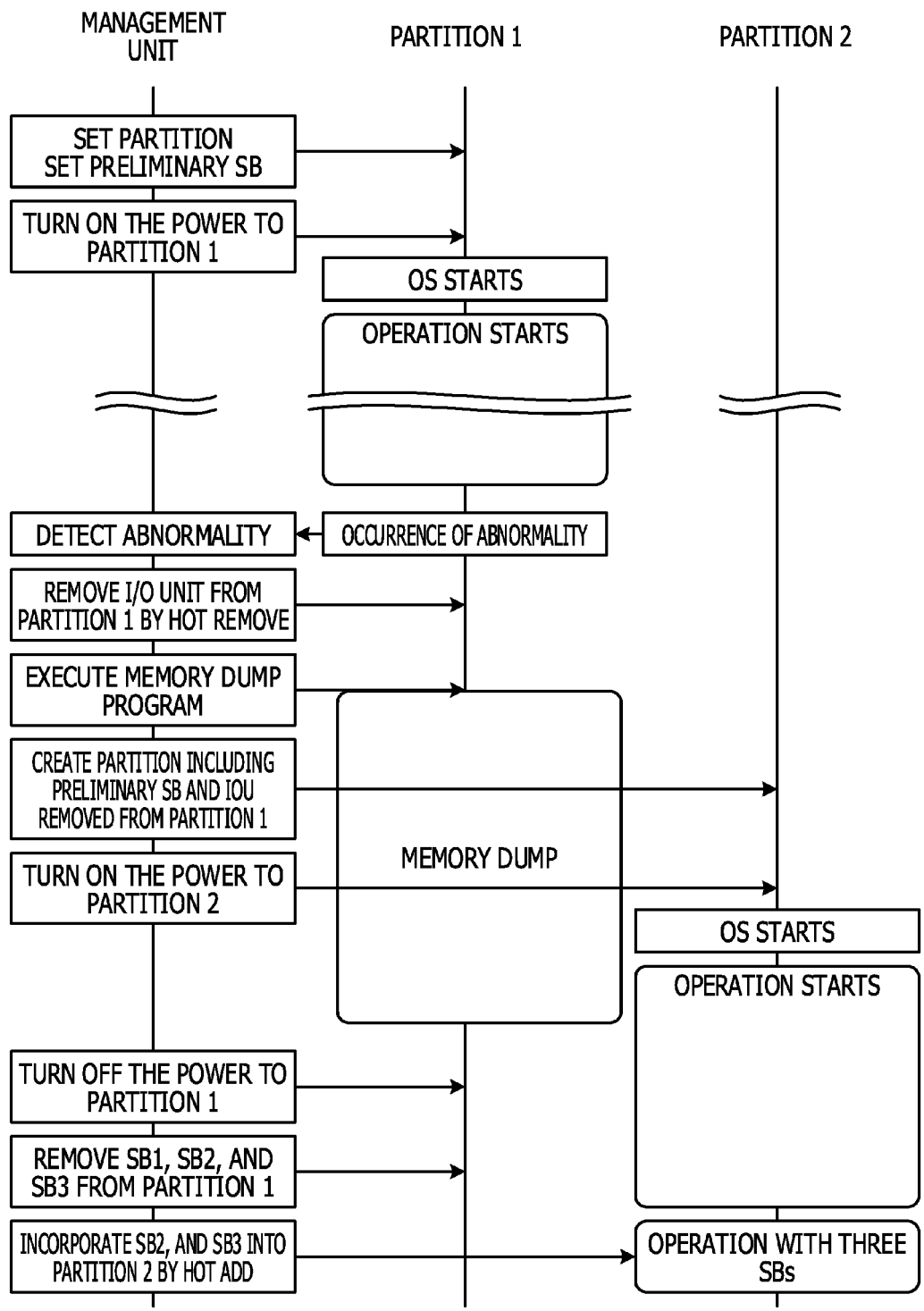
FIG. 8 is a diagram illustrating a processing sequence according to the present embodiment.

FIG. 8 illustrates a processing sequence according to the present embodiment. In this processing sequence, processing of the management unit 130, the partition 1, and the partition 2 are illustrated. In this regard, in FIG. 8, a system board is abbreviated to SB, and an I/O unit is abbreviated to an IOU.

The management unit 130 creates the partition 1, and performs the setting of the partition 1. The data on the setting is stored in the partition table in the management data storage unit 1307. Also, the management unit 130 performs the setting of the preliminary system board. The data on the setting is stored in the reserve table in the management data storage unit 1307.

The management unit 130 turns on the power to the partition 1. In response to this, the OS starts in the partition 1, and operation is started.

It is assumed that after starting operation, the abnormality has occurred in the system board 1 in the partition 1. The management unit 130 detects the abnormality that has occurred in the partition 1.

The management unit 130 removes the I/O units included in the partition 1 from the partition 1 by Hot Remove. Thereby, there is no I/O unit left in the partition 1, and there remains a system board.

The management unit 130 executes the memory dump program 101 in the BIOS on the DIMM 102 of the system board included in the partition 1. Thereby, the memory dump is started in the partition 1. In parallel with the memory dump, the management unit 130 creates a partition that includes a preliminary system board, and the I/O units included in the partition 1. And the management unit 130 turns on the power to the partition 2. In response to this, the OS is started in the partition 2, and the operation is started.

When the memory dump in the partition 1 is completed, the management unit 130 detects the completion of the memory dump.

The management unit 130 turns off the power to the partition 1. And the management unit 130 removes the system board S1, the system board S2, and the system board S3 from the partition 1.

The management unit 130 incorporates the system board S2, and the system board S3 that are system boards in which the abnormality has not occurred into the partition 2 by Hot Add.

In this regard, in the present processing sequence, the operation of the partition 2 is started after the execution of the memory dump is started. However, as the example in FIG. 6, the execution of the memory dump may be started after starting the operation of the partition 2.

As described above, by the present embodiment, it becomes possible to obtain dump data without omission while reducing the influence on the operational processing.

A description will be given more specifically of acquisition of dump data according to the present embodiment with reference to FIG. 9 to FIG. 12. FIG. 9 to FIG. 12 illustrate configurations of the server 1. However, the configurations are simplified in order to make the diagrams easily viewable.

Figure 9:
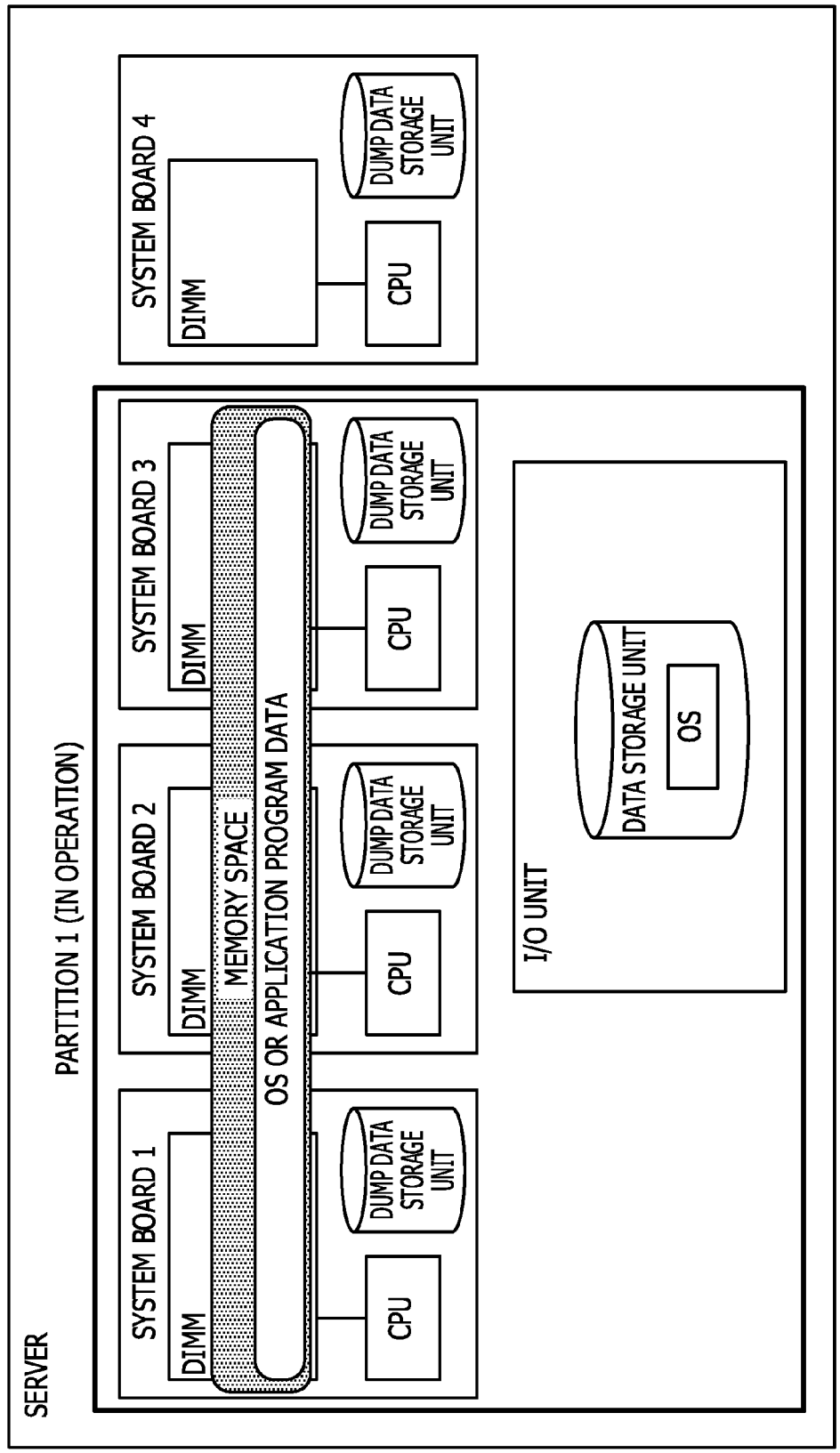
FIG. 9 is a diagram for explaining acquisition of dump data according to the present embodiment.

In FIG. 9, the partition 1 is in operation. The partition 1 includes a system board 1, a system board 2, a system board 3, and an I/O unit. The memory space used by the partition 1 covers the DIMM 102 in the system board 1, the DIMM 102 in the system board 2, and the DIMM 102 in the system board 3. The OS or data of application programs executed by the OS are stored in the DIMMs 102. The system board 4 is a preliminary system board, and is not allocated to any one of the partitions.

Figure 10:
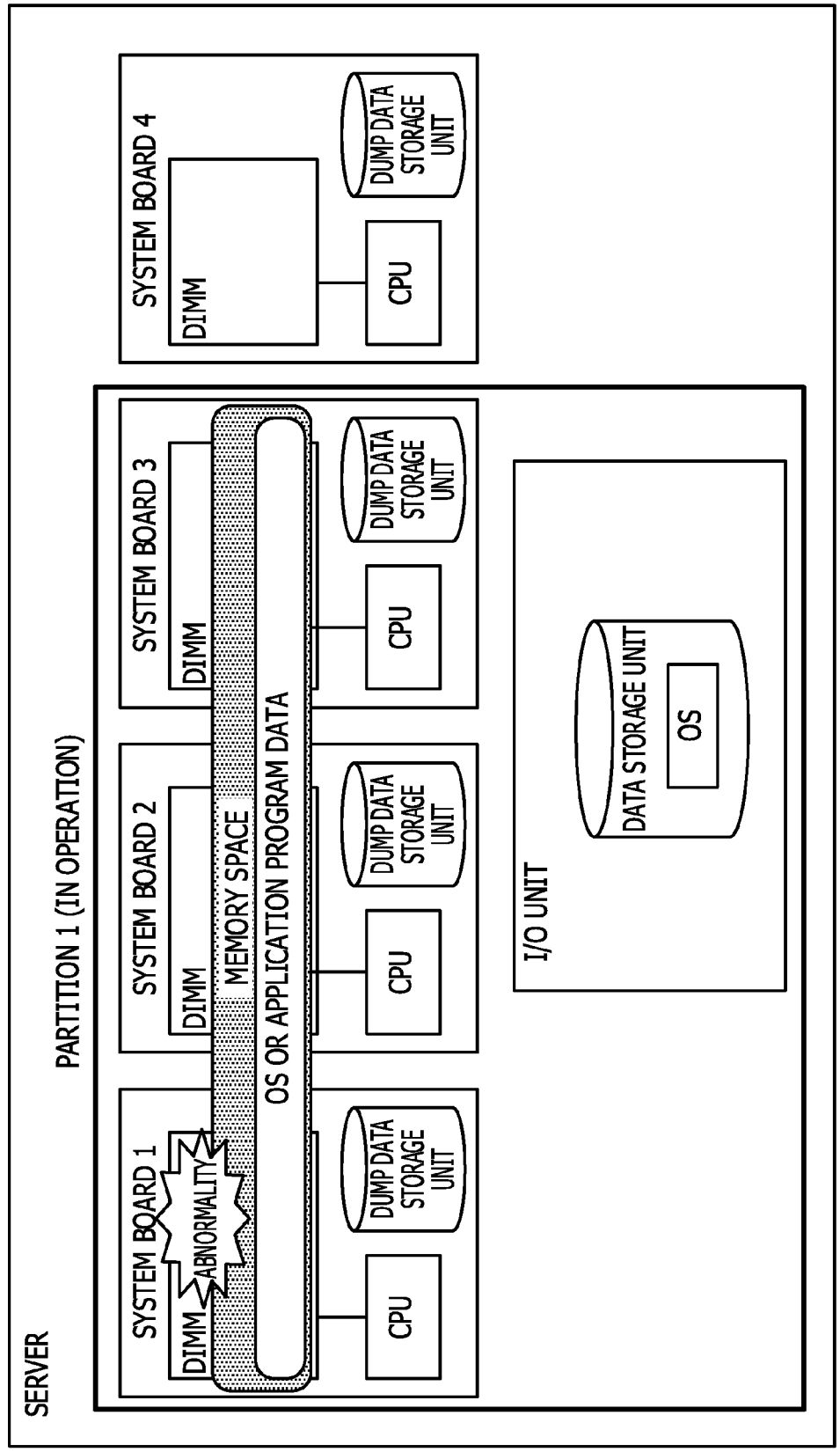
FIG. 10 is a diagram for explaining acquisition of dump data according to the present embodiment.

In FIG. 10, an abnormality occurs in the system board 1. At the time when the abnormality occurs, there are data in the DIMM 102 in the system board 1, the DIMM 102 in the system board 2, and the DIMM 102 in the system board 3, and thus memory dumps are taken on these data. When the abnormality detection unit 1301 detects the abnormality, processing for switching partitions is executed.

Figure 11:
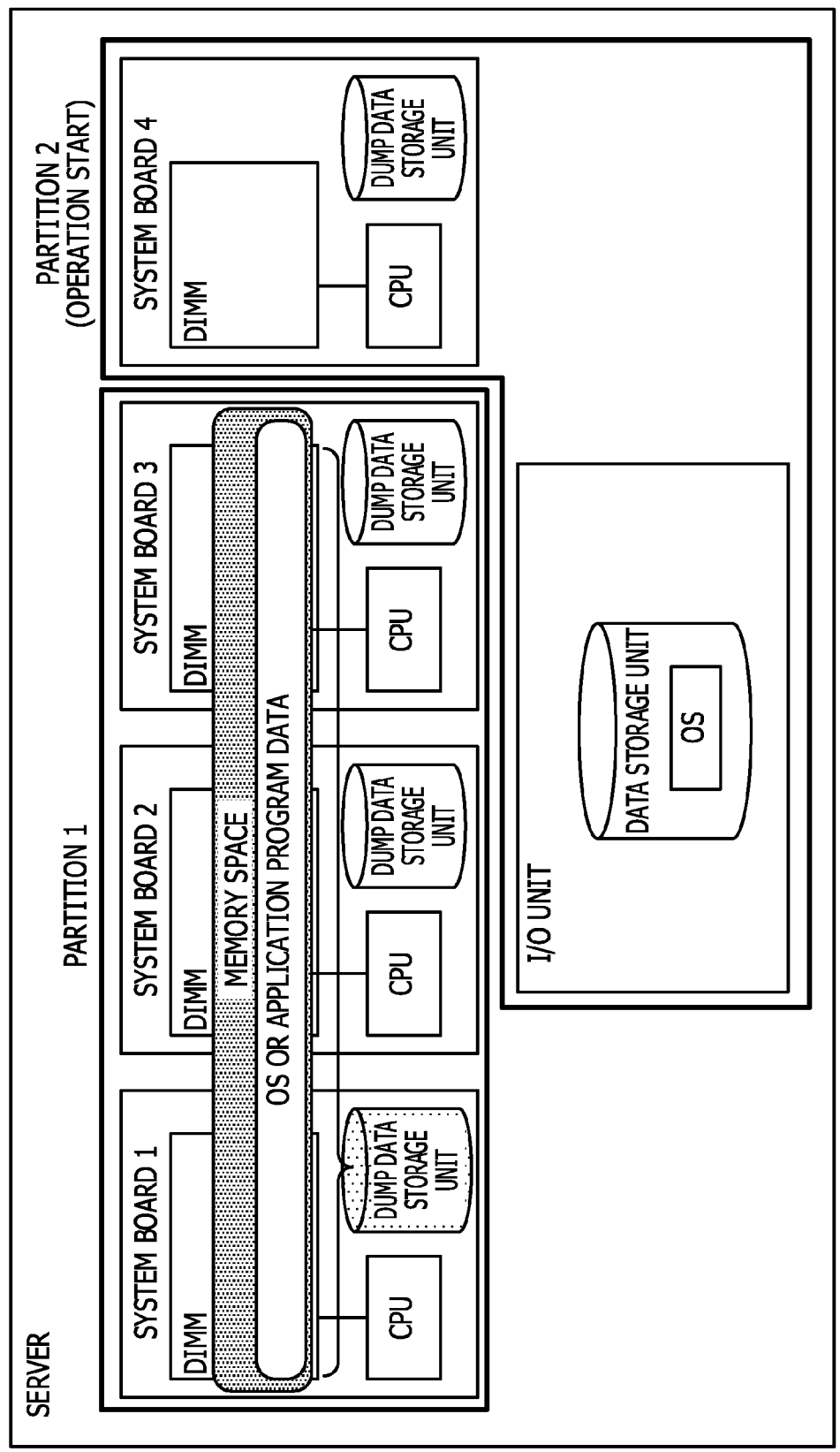
FIG. 11 is a diagram for explaining acquisition of dump data according to the present embodiment.

In FIG. 11, a partition 2 is newly created, and operation of the partition 2 is started. The partition 2 includes a system board 4 and an I/O unit. The partition 1 is not in operation. The I/O units that were allocated to the partition 1 have been removed from the partition 1 by Hot Remove, and are allocated to the partition 2. On the other hand, memory dumps are taken on the DIMM 102 in the system board 1, the DIMM 102 in the system board 2, and the DIMM 102 in the system board 3, and the dump data is stored in the dump data storage unit 100 in the system board 1.

Figure 12:
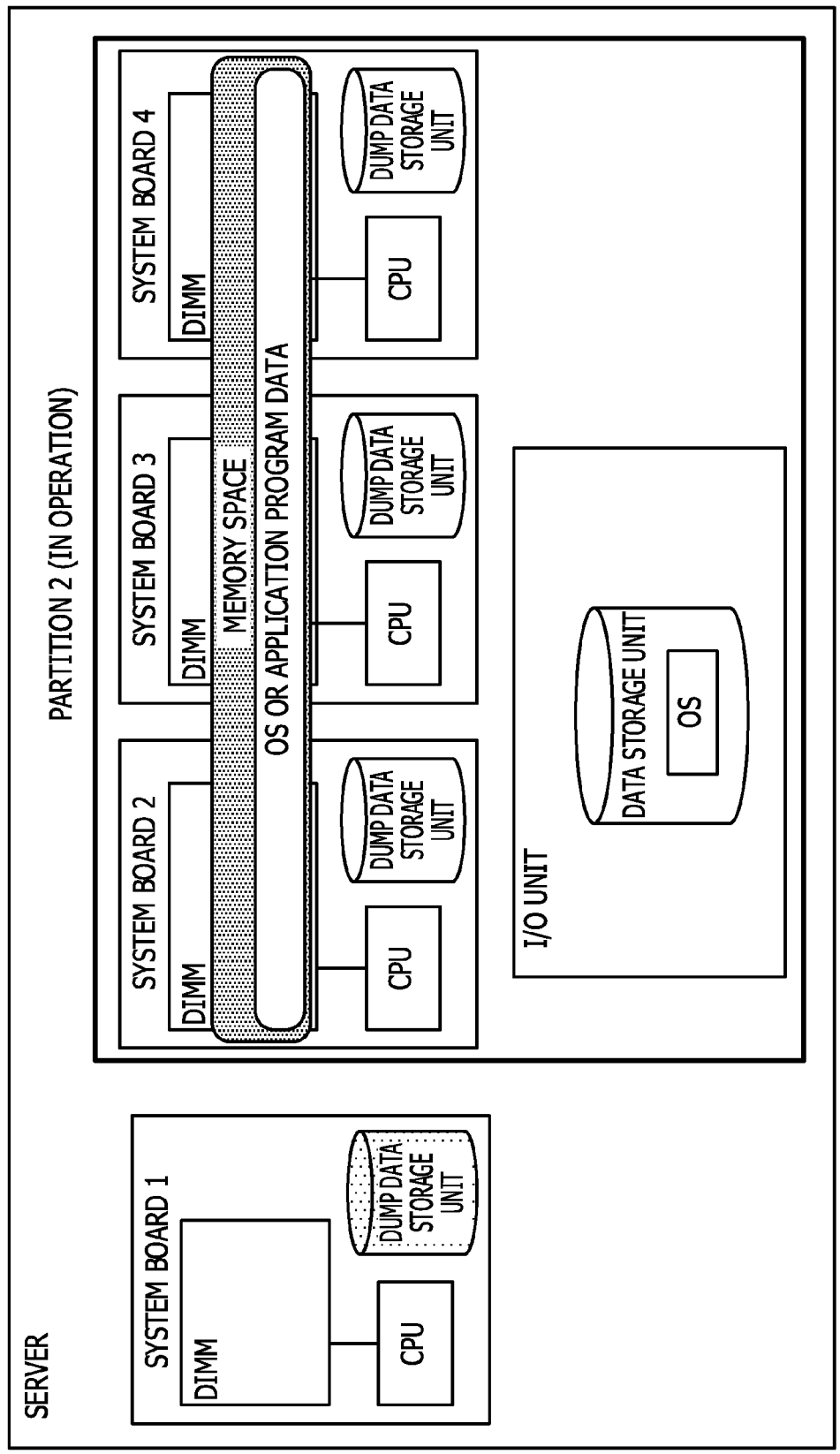
FIG. 12 is a diagram for explaining acquisition of dump data according to the present embodiment.

In FIG. 12, the partition 2 is in operation. Among the system boards included in the partition 1, the system board 2 and the system board 3 that are system boards in which an abnormality has not occurred are added to the partition 2 by Hot Add. The memory space used by the partition 2 covers the DIMM 102 in the system board 2, the DIMM 102 in the system board 3, and the DIMM 102 in the system board 4. The OS or data of application programs executed by the OS are stored in the DIMMs 102. The power to the partition 1 is turned off, and the system board 1 in which an abnormality has occurred is not allocated to any one of the partitions. The dump data is stored in the dump data storage unit 100 of the system board 1, and the dump data is used for abnormality analysis.

In this manner, even if a plurality of system boards are included in a partition, it becomes possible to obtain dump data without omission, that is to say, without failing to obtain a part of the data in the memory. Also, even if the processing proceeds to the processing in the partition 2, which is caused by the occurrence of an abnormality in the partition 1, it is possible to restrain a substantial decrease in processing performance. Also, it is possible to minimize stop time of the processing. That is to say, it becomes possible to reduce the influence on operational processing.

In this regard, at the time of starting operation of the partition 2, the number of the system boards is small, and thus the processing performance of the operational processing is deteriorated. However, after the completion of the memory dump, the number of the system boards becomes three, which is the same number as the original number, and thus the processing performance returns to the original.

A description will be given of acquisition of dump data in the case of not using the method according to the present embodiment with reference to FIG. 13 to FIG. 15.

Figure 13:
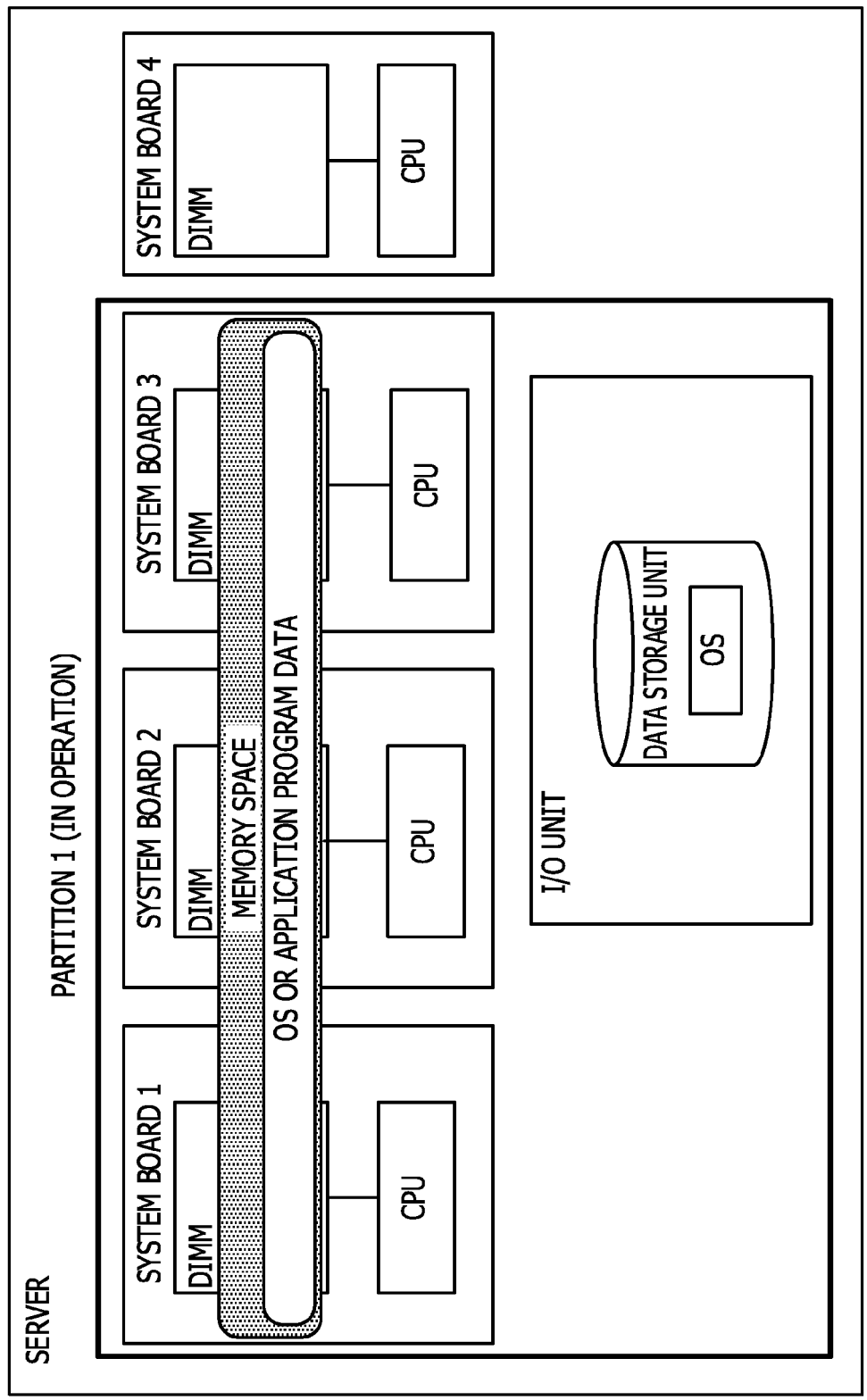
FIG. 13 is a diagram for explaining acquisition of dump data in the case of not using the method according to the present embodiment.

In FIG. 13, the partition 1 is in operation. The partition 1 includes the system board 1, the system board 2, and the system board 3, and the I/O unit. The memory space used by the partition 1 covers the DIMM 102 in the system board 1, the DIMM 102 in the system board 2, and the DIMM 102 in the system board 3. The OS or data of application programs executed by the OS are stored in the DIMMs 102. The system board 4 is a preliminary system board, and is not allocated to any one of the partitions.

Figure 14:
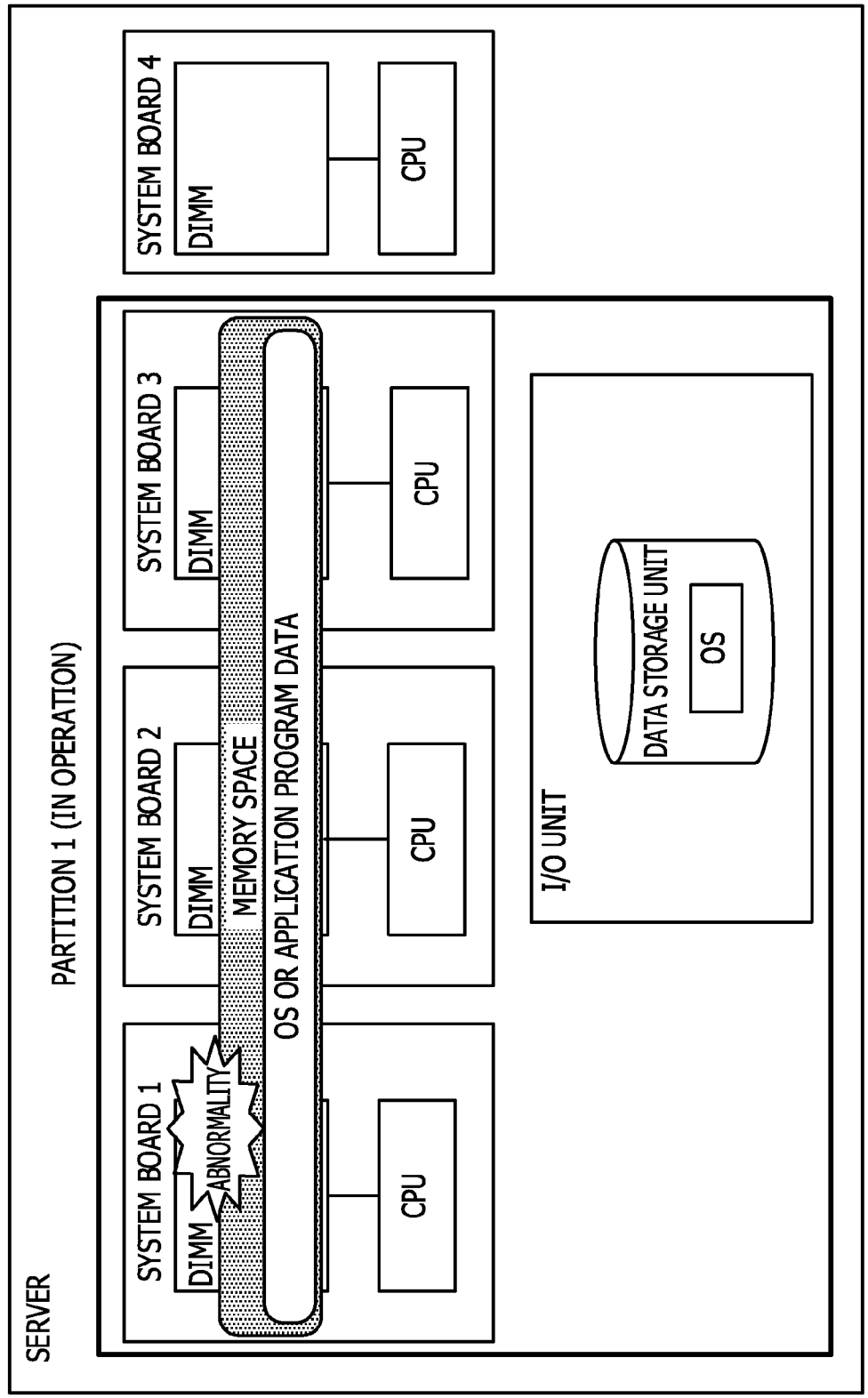
FIG. 14 is a diagram for explaining acquisition of dump data in the case of not using the method according to the present embodiment.

In FIG. 14, an abnormality occurs in the system board 1. At the time when the abnormality occurs, there are data in the DIMM 102 in the system board 1, the DIMM 102 in the system board 2, and the DIMM 102 in the system board 3.

Figure 15:
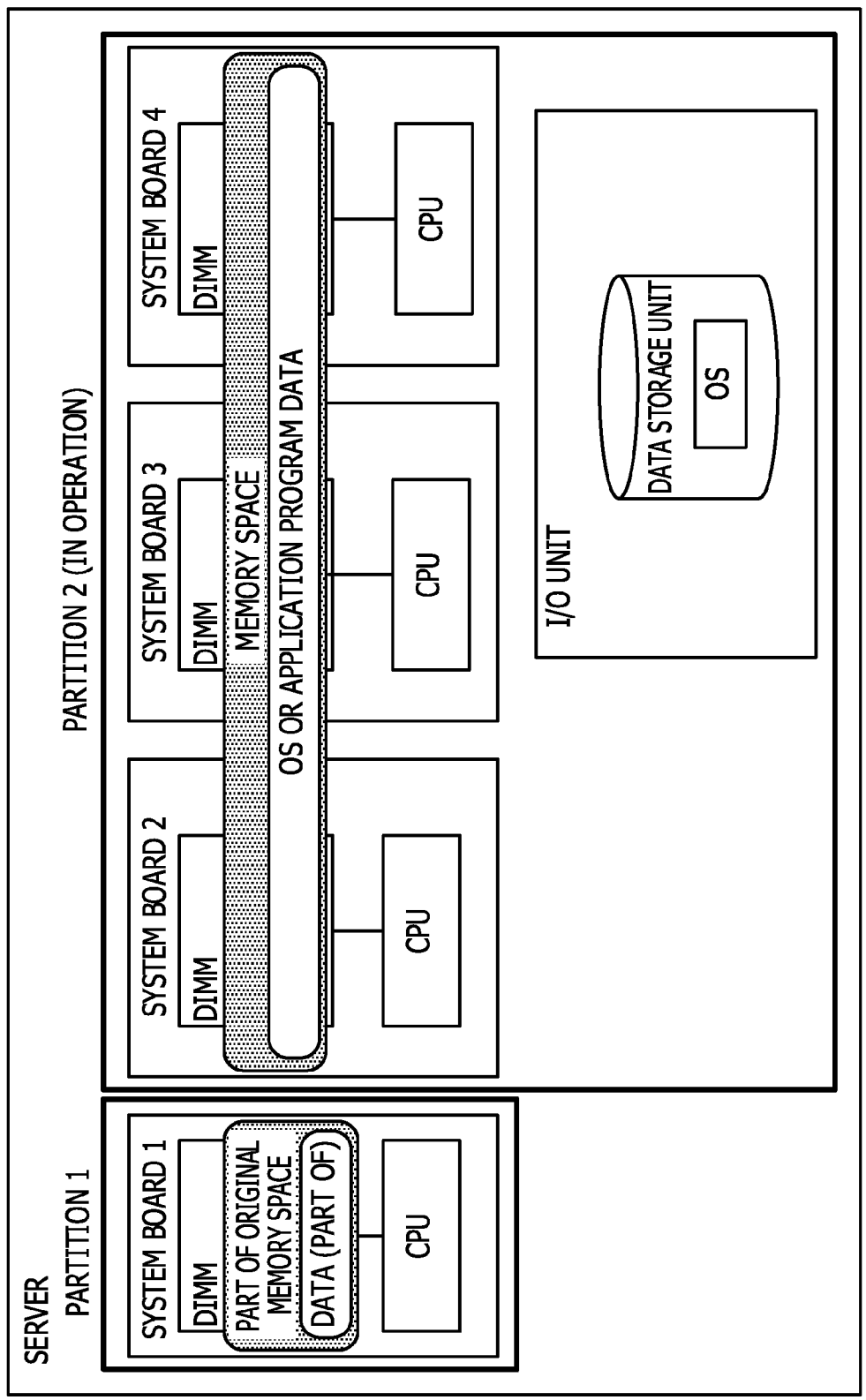
FIG. 15 is a diagram for explaining acquisition of dump data in the case of not using the method according to the present embodiment.

In the case of not using the method according to the present embodiment, as illustrated in FIG. 15, only a part of the data of the memory space used in the partition 1 is allowed to be obtained. In FIG. 15, memory dumps are not taken on the system board 2, and the system board 3 that have been allocated to the partition 1, and the system board 2 and the system board 3 are incorporated in the partition 2. The partition 2 is in operation, and the data in the DIMM 102 of the system board 2, and the DIMM 102 in the system board 3 have been rewritten. Thus, the data that have been existent in the DIMM 102 of the system board 2, and the DIMM 102 in the system board 3 at the time of the occurrence of the abnormality are not existent any longer. Accordingly, only the data in the DIMM 102 in the system board 1 is allowed to be obtained. Even if the dump data in this manner is used, it is not possible to correctly identify the cause of the abnormality.

Second Embodiment

Figure 16:
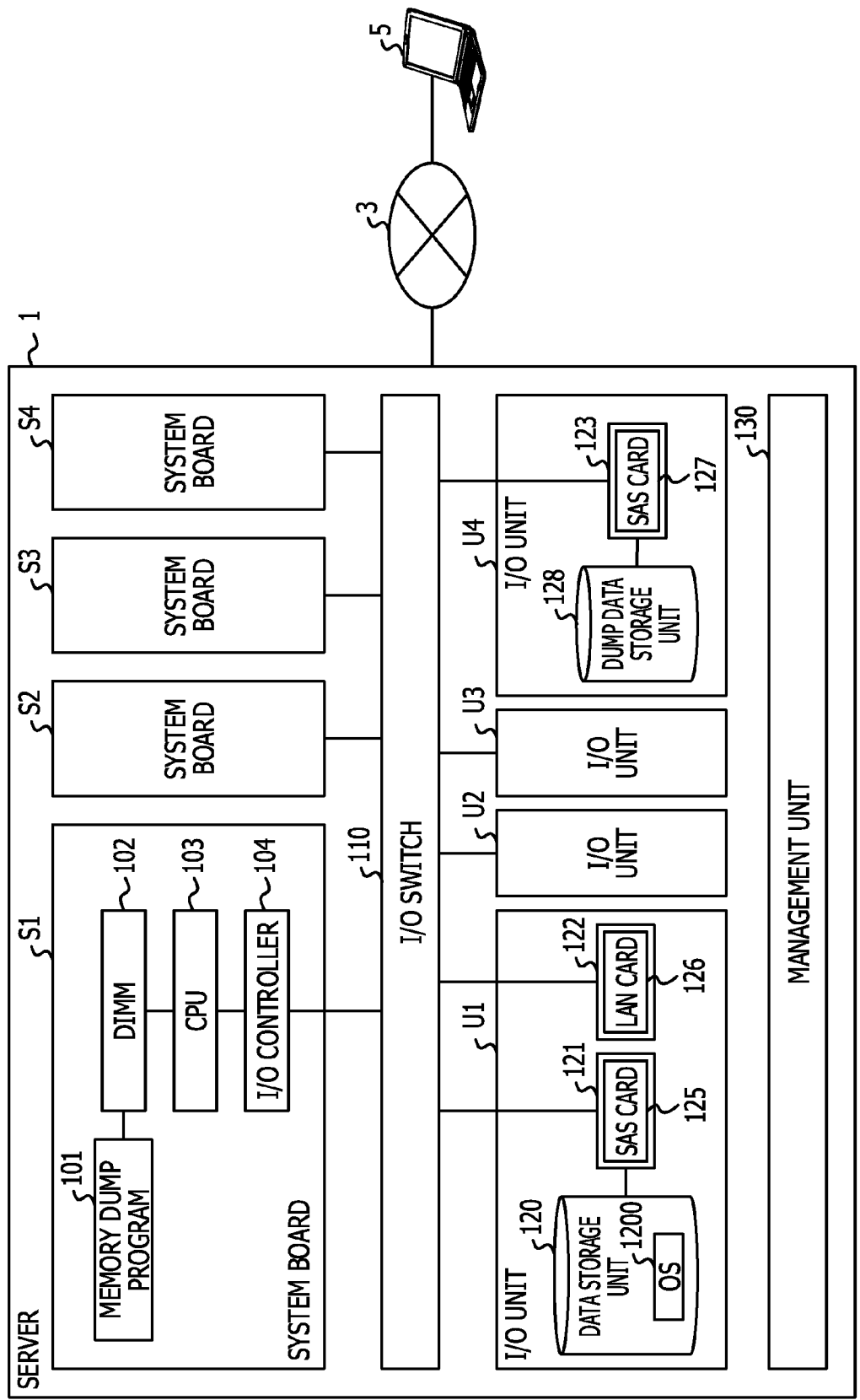
FIG. 16 is a diagram illustrating an overview of a system according to a second embodiment.

FIG. 16 illustrates an overview of a system according to a second embodiment. In the second embodiment, a dump data storage unit 128 is disposed in an I/O unit, and the dump data storage unit 100 is not disposed in a system board. The other points are the same as those in the first embodiment.

Figure 17:
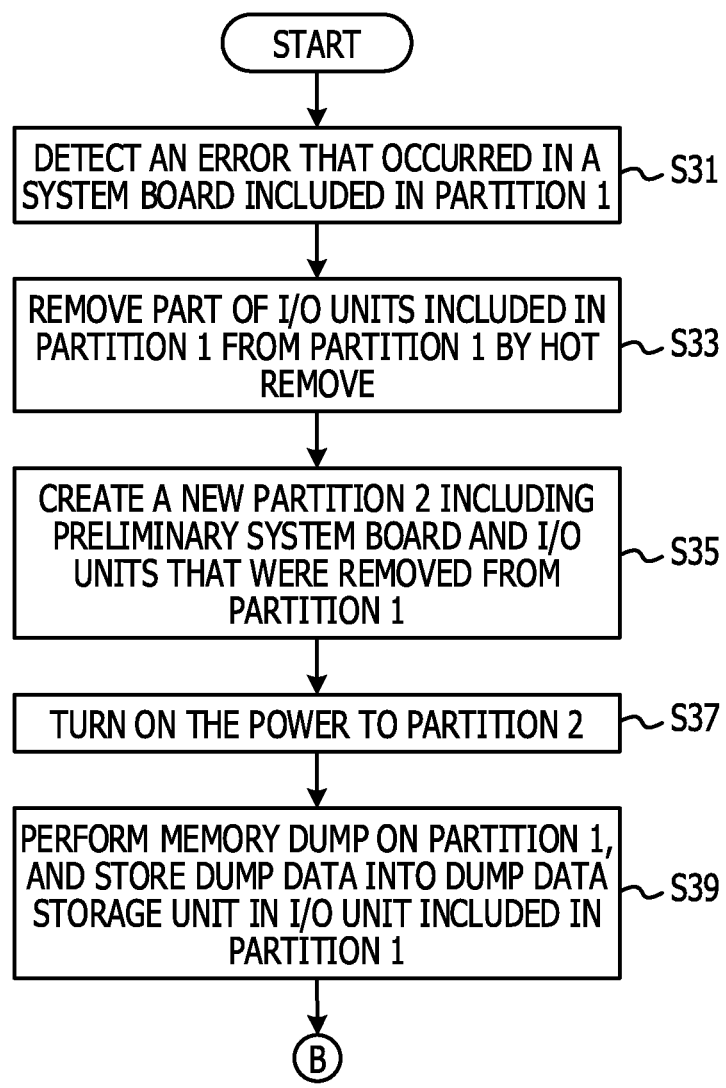
FIG. 17 is a flowchart of processing when an error occurs in a partition in operation.

Next, a description will be given of operation of a server 1 according to the second embodiment with reference to FIG. 17 and FIG. 18. The processing that is executed at the time of starting operational processing is the same as that of the first embodiment. And thus, a description will be given of processing in the case of the occurrence of an error in a partition in operation.

First, the abnormality detection unit 1301 detects an error that has occurred in a system board included in the partition 1 (step S31). For example, the abnormality detection unit 1301 detects an error that has occurred in the system board 1. The abnormality detection unit 1301 notifies the detection of an abnormality to the partition management unit 1304.

The removal unit 1309 in the partition management unit 1304 removes the I/O units included in the partition 1 from the partition 1 by Hot Remove (step S33). For example, the removal unit 1309 removes the I/O unit U1, the I/O unit U2, and the I/O unit U3 from the partition 1. In this regard, the removal unit 1309 updates data on the partition 1 that is stored in the partition table in the management data storage unit 1307 so that the removal of the I/O unit is reflected on the data.

The first management unit 1305 creates a new partition 2 including the preliminary system board stored in the reserve table in the management data storage unit 1307, and the I/O units that have been removed from the partition 1 (step S35). For example, first management unit 1305 creates a partition 2 including the system board S4, the I/O unit U1, the I/O unit U2, and the I/O unit U3. In this regard, the first management unit 1305 stores data in the partition 2 into the partition table in the management data storage unit 1307.

The first management unit 1305 turns on the power to the partition 2 (step S37). Thereby, the OS 1200 in any one of the I/O units included in the partition 2 is started, and the operational processing is restarted.

The memory dump control unit 1303 performs a memory dump on the partition 1 by the memory dump program 101 in the BIOS. And the memory dump control unit 1303 stores dump data obtained by the executing of the memory dump into the dump data storage unit 128 of the I/O unit included in the partition 1 (step S39). For example, the memory dump control unit 1303 stores dump data into the dump data storage unit 128 of the I/O unit U4. By the processing in step S39, it is possible to obtain the data in the DIMM 102 at the time of the occurrence of an abnormality without omission. The processing proceeds to step S41 in FIG. 18 through a connector symbol B.

Figure 18:
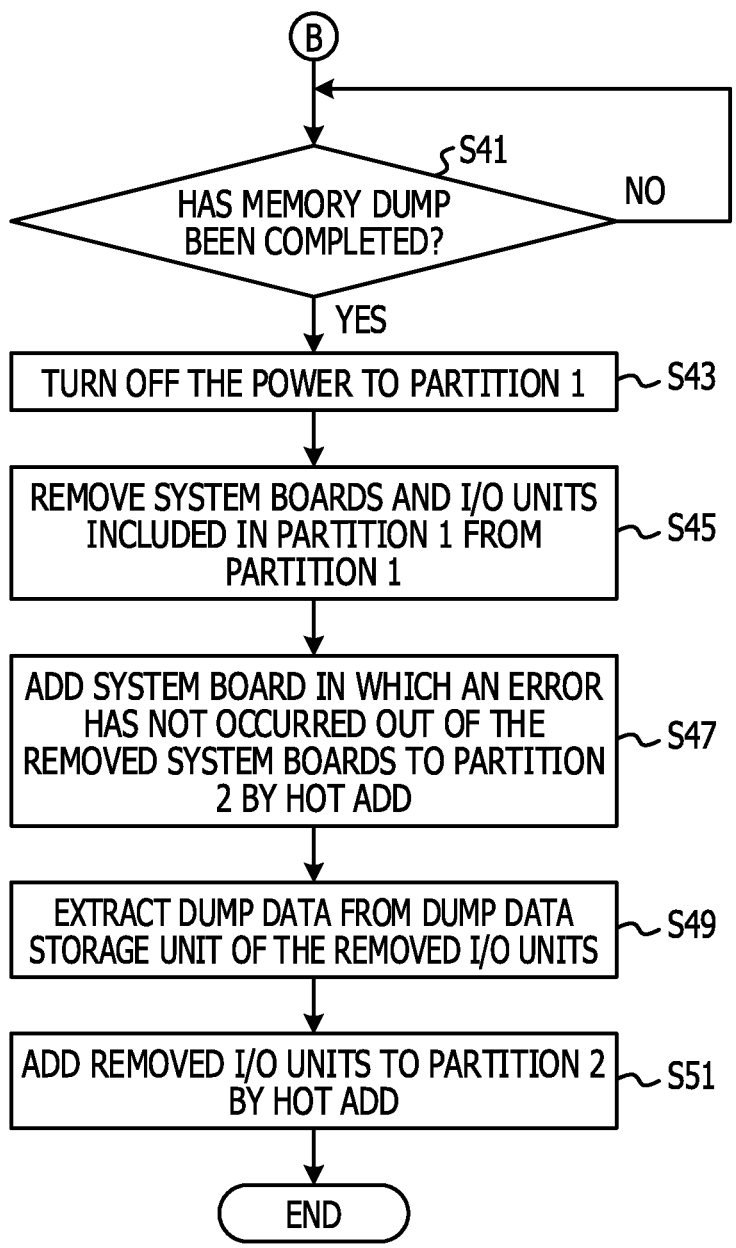
FIG. 18 is a flowchart of processing when an error occurs in a partition in operation.

Referring to FIG. 18, the memory dump control unit 1303 makes an inquiry to the memory dump program 101 in order to determine whether the memory dump has completed (step S41). In this regard, the memory dump control unit 1303 makes inquiries on a regular basis, for example.

If the memory dump has not been completed (step S41: No), the processing in step S41 is performed again. If the memory dump has been completed (step S41: Yes), the memory dump control unit 1303 notifies the completion of the memory dump to the partition management unit 1304.

The second management unit 1306 in the partition management unit 1304 turns off the power to the partition 1 (step S43). Also, the second management unit 1306 removes the system boards included in the partition 1 from the partition 1 (step S45). For example, the second management unit 1306 removes the system board S1, the system board S2, and the system board S3, and the I/O unit U4 from the partition 1. In this regard, the second management unit 1306 updates the data on the partition 1 stored in the partition table in the management data storage unit 1307 so that the removal of the system boards and the I/O unit is reflected on the data.

The addition unit 1308 adds a system board in which an error has not occurred among the system boards that have been removed in step S45 to the partition 2 by Hot Add (step S47). For example, the addition unit 1308 adds the system board S2, and the system board S3 to the partition 2 by Hot Add. And the processing is completed.

The second management unit 1306 extracts the dump data from the dump data storage unit 128 of the I/O unit that was removed in step S45 (step S49), and stores the dump data into another disk device, or the like, not illustrated in FIG. 16. The extracted dump data is used for analysis of the cause.

The addition unit 1308 adds the I/O unit that was removed in step S45 to the partition 2 by Hot Add (step S51). And the processing is completed.

By executing the above-described processing, it becomes possible to obtain dump data without omission even in the case of not providing the system board with a dump data storage unit, and providing the I/O unit with the dump data storage unit.

In the above, descriptions have been given of embodiments of the present disclosure. However, the present disclosure is not limited to these embodiments. For example, there are cases where the functional block configuration of the server 1, which has been described above, does not match the actual program module configuration.

Also, the structures of the individual tables described above are examples, and the above-described structures does not have to be employed. Further, in the processing flowcharts, it is possible to exchange the orders of the processing as far as the processing result will not change. Further, it is allowed to execute the processing in parallel.

In this regard, in the above-described example, the management unit 130 and the system boards are included in a same server. However, the management unit 130 may be disposed in a server different from a server to which system boards are mounted.

The overview of the embodiments of the present disclosure, described above, is as follows.

According to an embodiment of the present disclosure, there is provided an information processing apparatus including: when an abnormality occurs in any one of system boards among a plurality of system boards included in a first partition, a first processing unit configured to create a second partition including a preliminary system board not included in the first partition; a second processing unit configured to perform a memory dump on each of a plurality of system boards included in the first partition to obtain the dump data; and after the memory dump is performed by the second processing unit, a third processing unit configured to add system boards other than the system board in which the abnormality has occurred among the system boards included in the first partition to the second partition.

In this manner, even if a partition includes a plurality of system boards, it becomes possible to obtain dump data without omission and without losing a part of data in a memory. Also, if an abnormality occurs in the first partition, and the processing proceeds to processing in the second partition, it is possible to restrain a substantial decrease in processing performance. Also, it is possible to minimize stop time of the processing. That is to say, it becomes possible to reduce the influence on operational processing.

Also, the above-described first partition may further include a module for inputting and outputting data. And the information processing apparatus may further include a fourth processing unit configured to remove the module for inputting and outputting data from the first partition by Hot Swap, and the above-described first processing unit may create a second partition including the modules removed from the first partition by the fourth processing unit, and the preliminary system board. In this manner, it is possible to move modules in a state in which the power to the first partition is on, and thus it becomes possible to shorten time in which modules in the second partition are insufficient.

Also, the above-described third processing unit may add system boards other than a system board in which an abnormality has occurred among the system boards included in the first partition to the second partition by Hot Swap. In this manner, it becomes possible to move system boards in the state in which the power to the second partition is on.

Also, the information processing apparatus may further include a fifth processing unit configured to turn off the power to the first partition, and to remove system boards other than the system board in which an abnormality has occurred among the system boards included in the first partition from the first partition. In this manner, it becomes possible to avoid the occurrence of a problem at the time of removing a system board from the first partition.

Also, the above-described second processing unit may store the obtained dump data into a storage unit held by any one of the system boards among the plurality of system boards, or a storage unit held by a module for inputting and outputting data. In this manner, it becomes possible to use the obtained dump data for abnormality analysis, and the like.

According to another embodiment of the present disclosure, there is provided a memory dump method including: when an abnormality occurs in any one of system boards among a plurality of system boards included in a first partition, creating a second partition including a preliminary system board not included in the first partition; performing a memory dump on each of a plurality of system boards included in the first partition to obtain dump data; and after the memory dump is performed, adding system boards other than the system board in which the abnormality has occurred among the system boards included in the first partition to the second partition.

In this regard, it is possible to create a program for causing a computer to perform the processing using the above-described method. The program is stored in a computer-readable storage medium or a storage device, for example, a flexible disk, a CD-ROM, a magneto-optical disc, a semiconductor memory, a hard disk, and the like. In this regard, an intermediate processing result is temporarily stored in a storage device, such as a main memory, or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A memory dump method comprising:
    generating a first partition including a first system board, a second system board, and one or more storage units, each of the first system board and the second system board including a memory, each of the one or more storage units storing a program corresponding to an information processing;
    starting the information processing using a first partition based on the program stored in the one or more storage units;
    detecting an error in the first system board;
    after detecting the error, removing all of the one or more storage units included in the first partition;

after the removing all of the one or more storage units, generating a second partition including a third system board and the one or more storage units removed from the first partition;
restarting the information processing using the second partition based on the program stored in the one or more storage units;
after the removing all of the one or more storage units, performing a memory dump on each of the first system board and the second system board to obtain dump data.

2. The memory dump method according to claim 1, further comprising:
after the memory dump is performed, adding the second system board to the second partition.

3. The memory dump method according to claim 2, wherein, an input and output device is removed from the first partition by hot swap.

4. The memory dump method according to claim 1, wherein, the second device is added to the second partition by hot swap.

5. The memory dump method according to claim 1, further comprising:
stopping power supply to the first partition, and
removing the first system board from the first partition by updating a definition information on the first partition.

6. The memory dump method according to claim 1, further comprising:
storing the obtained dump data into a storage unit embedded in the first device, a storage unit embedded in the second device, or a storage unit embedded in an input and output device.

7. The memory dump method according to claim 1, wherein the first device is a first system board and the second device is a second system board.

8. An information processing apparatus comprising:
a first device, a second device and a third device; and
a processor coupled to the first device, the second device and the third device, and configured to
generate a first partition including a first system board, a second system board, and one or more storage units, each of the first system board and the second system board including a memory, each of the one or more storage units storing a program corresponding to an information processing;
start the information processing using a first partition based on the program stored in the one or more storage units;
detect an error in the first system board;
after detecting the error, remove all of the one or more storage units included in the first partition;
after the removing all of the one or more storage units, generate a second partition including a third system board and the one or more storage units removed from the first partition;
restart the information processing using the second partition based on the program stored in the one or more storage units;
after the removing all of the one or more storage units, perform a memory dump on each of the first system board and the second system board to obtain dump data.

9. The information processing apparatus according to claim 8, the processor is configured to
after the memory dump is performed, add the second system board to the second partition.

10. The information processing apparatus according to claim 9,
wherein an input and output device is removed from the first partition by hot swap.

11. The information processing apparatus according to claim 8,
wherein the second device is added to the second partition by hot swap.

12. The information processing apparatus according to claim 8, the processor is configured to
stop power supply to the first partition, and
remove the first system board from the first partition by updating a definition information on the first partition.

13. The information processing apparatus according to claim 8, the processor is configured to
store the obtained dump data into a storage unit embedded in the first device, a storage unit embedded in the second device, or a storage unit embedded in an input and output device.

14. The information processing apparatus according to claim 8,
wherein the first device is a first system board and the second device is a second system board.

15. A non-transitory computer-readable storage medium storing a control program that causes an information processing apparatus to execute a process, the process comprising:
generating a first partition including a first system board, a second system board, and one or more storage units, each of the first system board and the second system board including a memory, each of the one or more storage units storing a program corresponding to an information processing;
starting the information processing using a first partition based on the program stored in the one or more storage units;
detecting an error in the first system board;
after detecting the error, removing all of the one or more storage units included in the first partition;
after the removing all of the one or more storage units, generating a second partition including a third system board and the one or more storage units removed from the first partition;
restarting the information processing using the second partition based on the program stored in the one or more storage units;
after the removing all of the one or more storage units, performing a memory dump on each of the first system board and the second system board to obtain dump data.

16. The non-transitory computer-readable storage medium according to claim 15, the process further comprising:
after the memory dump is performed, adding the second system board to the second partition.

17. The non-transitory computer-readable storage medium according to claim 16, wherein, an input and output device is removed from the first partition by hot swap.

18. The non-transitory computer-readable storage medium according to claim 15, wherein, the second device is added to the second partition by hot swap.

19. The non-transitory computer-readable storage medium according to claim 15, the process further comprising:
stopping power supply to the first partition, and
removing the first system board from the first partition by updating a definition information on the first partition.

20. The non-transitory computer-readable storage medium according to claim 15, wherein the first device is a first system board and the second device is a second system board.

\* \* \* \* \*